US 12,474,700 B2

United States Patent
Macauda et al.

(10) Patent No.: US 12,474,700 B2
(45) Date of Patent: Nov. 18, 2025

(54) INDUSTRIAL PLANT OPERATOR INTERVENTION SYSTEM FOR USE IN AN INDUSTRIAL PLANT

(71) Applicant: ABB Schweiz AG, Baden (CH)

(72) Inventors: Andrea Macauda, Genoa (IT); Raja Sivalingam, Genoa (IT); Chandrika K R, Bangalore (IN); Matthias Berning, Worms (DE); Dawid Ziobro, Västerås (SE); Sylvia Maczey, Hirschberg (DE); Pablo Rodriguez, Ilvesheim (DE); Benjamin Kloepper, Mannheim (DE); Reuben Borrison, Schwetzingen (DE); Marcel Dix, Allensbach (DE); Benedikt Schmidt, Heidelberg (DE); Hadil Abukwaik, Weinheim (DE); Arzam Muzaffar Kotriwala, Ladenburg (DE); Divyasheel Sharma, Karnataka (IN); Gayathri Gopalakrishnan, Spånga (SE); Simon Linge, Västerås (SE); Marco Gaertler, Dossenheim (DE); Jens Doppelhamer, Ladenburg (DE)

(73) Assignee: ABB Schweiz AG, Baden (CH)

( * ) Notice: Subject to any disclaimer, the term of this patent is extended or adjusted under 35 U.S.C. 154(b) by 536 days.

(21) Appl. No.: 17/899,856

(22) Filed: Aug. 31, 2022

(65) Prior Publication Data
US 2023/0074570 A1   Mar. 9, 2023

(30) Foreign Application Priority Data
Sep. 1, 2021   (EP) ..................... 21194380

(51) Int. Cl.
G05B 23/02   (2006.01)

(52) U.S. Cl.
CPC ..... G05B 23/0272 (2013.01); G05B 23/0275 (2013.01)

(58) Field of Classification Search
CPC ............ G05B 23/0272; G05B 23/0275; G05B 23/0267; G05B 15/02; G05B 19/4185;
(Continued)

(56) References Cited

U.S. PATENT DOCUMENTS 6,904,387 B2   6/2005   Melzer
8,332,773 B2   12/2012   Husoy et al.
(Continued)

FOREIGN PATENT DOCUMENTS

EP             1768005 B1        11/2011
WO      WO 2015/169681 A1        11/2015

OTHER PUBLICATIONS

Diego-Mas, J.A., Garzon-Leal, D., Poveda-Bautista, R. and Alcaide-Marzal, J., 2019. User-interfaces layout optimization using eye-tracking, mouse movements and genetic algorithms. Applied ergonomics, 78, pp. 197-209. (Year: 2019).*
(Continued)

Primary Examiner — Alicia M. Choi
(74) Attorney, Agent, or Firm — Leydig, Voit & Mayer, Ltd.

(57) ABSTRACT

An industrial plant operator intervention system for use in an industrial plant includes a processing unit configured to monitor and analyze industrial plant operation data to detect an anomaly in the industrial plant operation data that warrants initiating an operator intervention, and in response to detecting the anomaly, automatically determine a user interface configuration of a user interface to be presented to a designated operator who is to perform the operator intervention. The user interface configuration is determined on the basis of technical context data, including industrial plant
(Continued)

operation data associated with the anomaly, and on the basis of operator data pertaining to the designated operator, in such a manner that an anomaly-related and operator-specific user interface configuration is obtained.

15 Claims, 6 Drawing Sheets

(58) Field of Classification Search
CPC .............. G05B 19/4183; G05B 19/042; G05B 19/418; G05B 19/4184; G06Q 10/06
See application file for complete search history.

(56) References Cited

U.S. PATENT DOCUMENTS

| | | | |
|---|---|---|---|
| 9,323,247 B2 | 4/2016 | Dillon et al. | |
| 9,457,914 B1 | 10/2016 | Cline et al. | |
| 10,031,654 B2 | 7/2018 | Hams et al. | |
| 10,176,606 B2 | 1/2019 | Jammikunta et al. | |
| 10,235,853 B2 | 3/2019 | Kurella et al. | |
| 11,805,003 B2 * | 10/2023 | Mermoud ............ | G06F 18/2433 |
| 2004/0181364 A1 * | 9/2004 | Reeves .............. | G05B 19/4065 |
| | | | 702/182 |
| 2008/0188972 A1 * | 8/2008 | Miller ................. | G06F 18/2433 |
| | | | 700/110 |
| 2009/0077055 A1 * | 3/2009 | Dillon ................ | G05B 23/0272 |
| | | | 707/999.005 |
| 2009/0216341 A1 | 8/2009 | Enkerud et al. | |
| 2012/0005220 A1 | 1/2012 | Schindlauer et al. | |
| 2012/0240044 A1 | 9/2012 | Johnson et al. | |
| 2012/0310381 A1 * | 12/2012 | Karaffa ................ | G05B 19/418 |
| | | | 700/80 |
| 2013/0104064 A1 * | 4/2013 | McCormick ........ | G06F 3/04842 |
| | | | 715/765 |
| 2014/0096092 A1 | 4/2014 | Johnson | |
| 2015/0074543 A1 * | 3/2015 | Edwin ................... | G06F 3/0231 |
| | | | 715/745 |
| 2016/0342779 A1 * | 11/2016 | Johnson ............. | G06F 3/04815 |
| 2021/0233664 A1 * | 7/2021 | Colley ................. | G16H 50/70 |
| 2021/0310904 A1 * | 10/2021 | Revilla ............. | G05B 23/0275 |
| 2021/0382456 A1 * | 12/2021 | Watahiki ............ | G05B 19/4184 |
| 2022/0197260 A1 * | 6/2022 | Cheng .................. | G06T 7/0004 |

OTHER PUBLICATIONS

European Patent Office, Extended European Search Report in European Patent Application No. 21194380.8, 9 pp. (Feb. 23, 2022).

* cited by examiner

INDUSTRIAL PLANT OPERATOR INTERVENTION SYSTEM FOR USE IN AN INDUSTRIAL PLANT

CROSS-REFERENCE TO RELATED APPLICATIONS

This patent application claims priority to European Patent Application No. 21194380.8, filed on Sep. 1, 2021, which is incorporated herein in its entirety by reference.

FIELD OF THE DISCLOSURE

The present disclosure relates to an industrial plant operator intervention system for use in an industrial plant, also referred to simply as "plant" in the following.

BACKGROUND OF THE INVENTION

In industrial plants, processes have increasingly become more automated. For controlling the plant, control systems, such as distributed control systems (DCS), are often employed. Control systems have become increasingly more autonomous. However, in many cases, there is not yet a fully autonomous plant operation. This means that the systems control operation of the industrial plant mostly autonomously and only infrequently require steps to be manually performed by an operator. Such steps are referred to as operator intervention. As autonomous control systems become more sophisticated, the operator's role shifts toward supervision and, increasingly, operator interventions are for the most part only necessary when an unexpected event occurs technical issue occurs that cannot be autonomously resolved by the control system.

For example, although the control system may be able to take the majority of decisions, in some cases the system may determine that operator intervention is warranted, for example when the system is confronted with an event or technical issue for the first time and/or with an event or technical issue that cannot be classified and/or when a technical issue persists after one or more attempts of the system to resolve the technical issue without operator intervention and/or when the system determines that it is not able to take an action with a high level of accuracy. Operator intervention may be more frequent in the training stages of autonomous systems, and may then become less frequent.

Thus, there is a trend from reactive to proactive systems, i.e., to systems that do not require constant monitoring of data by an operator, but rather automatically monitor the plant operation and react to certain conditions automatically and involve the operator only if necessary.

Operator intervention may be directed at fault analysis and resolving technical issues pertaining to only part of the plant, like a subset of the plant's pieces of equipment. An intervention may be performed during continued overall plant operation. The intervention may be directed at resolving technical issues that impede at least part of the plant's operation, e.g., pose a security risk, make the operation less stable or efficient, or make continued operation of at least part of the plant entirely impossible.

Operator intervention generally involves a user interface allowing for the operator to interact with the system. Such user interfaces are also known as Human Machine Interfaces (MHIs) or operator workspaces and may often comprise user interface elements including one or more of graphics, trends, alarms, and reports concerning plant operation. Moreover, they generally include user interface elements allowing for the operator to interact with the system, i.e., to provide user input.

BRIEF SUMMARY OF THE INVENTION

In one general aspect, a system in accordance with the disclosure comprises a processing unit configured to monitor and analyze industrial plant operation data to detect an anomaly in the industrial plant operation data that warrants initiating an operator intervention and providing a user interface to be presented to a designated operator who is to perform the operator intervention. It is noted that the term operator refers to a human operator.

In one embodiment, user interfaces that may be used for or involved in operator intervention often do not allow for efficient and reliable intervention, but rather require a lot of time and/or effort to prepare and configure the user interface for proper operator intervention.

Thus, one of the problems solved by the invention is to allow for more efficient and reliable operator intervention in the context of a mostly autonomous operation of an industrial plant.

The disclosure describes an industrial plant operator intervention system for use in an industrial plant, the system comprising a processing unit configured to monitor and analyze industrial plant operation data to detect an anomaly in the industrial plant operation data that warrants initiating an operator intervention, and in response to detecting the anomaly that warrants initiating an operator intervention, automatically determine a user interface configuration of a user interface to be presented to a designated operator who is to perform the operator intervention. The user interface configuration is determined on the basis of technical context data, including industrial plant operation data associated with the anomaly, and on the basis of operator data pertaining to the designated operator, in such a manner that an anomaly-related and operator-specific user interface configuration is obtained.

BRIEF DESCRIPTION OF THE SEVERAL VIEWS OF THE DRAWING(S)

Figure 6A:
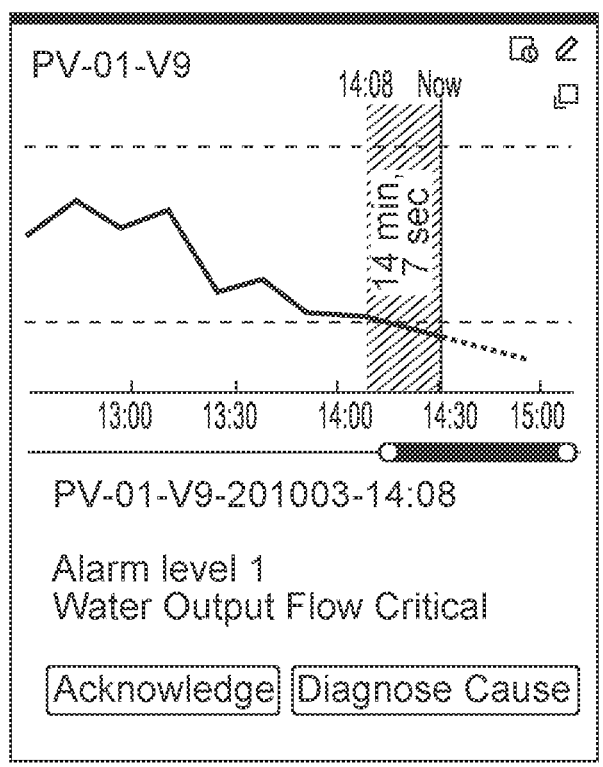
Figure 6B:
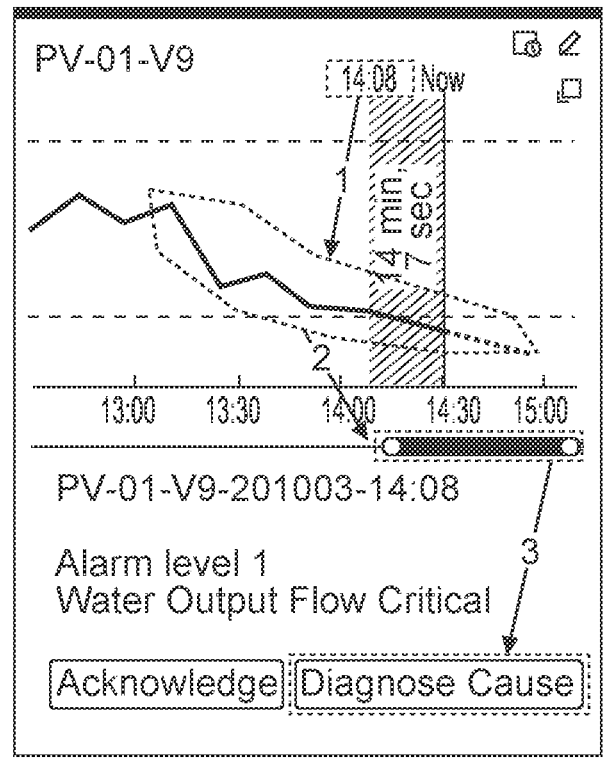
Figure 6C:
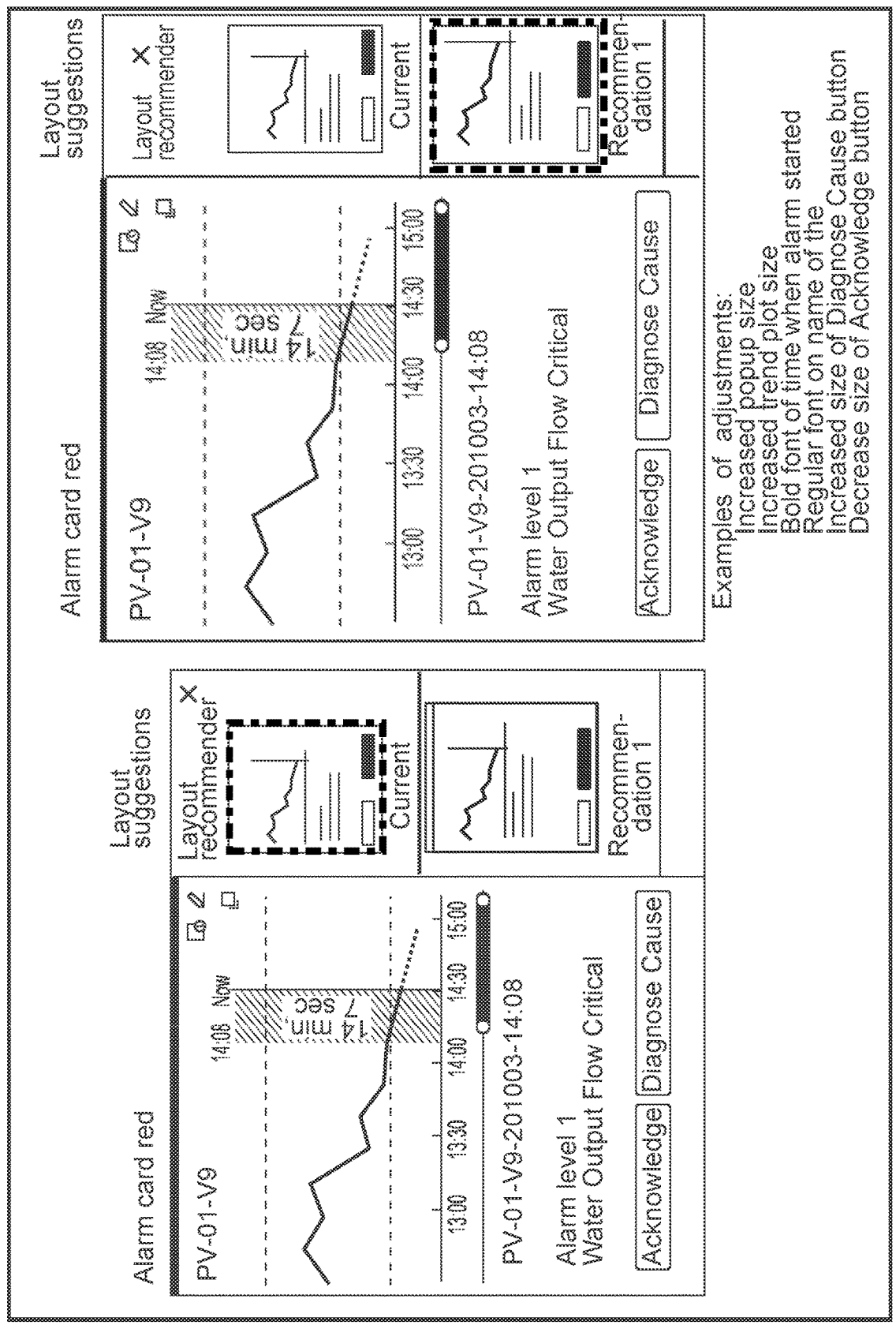

FIGS. 6a, 6b, and 6c illustrate exemplary user interfaces in accordance with the disclosure.

DETAILED DESCRIPTION OF THE INVENTION

Figure 1:
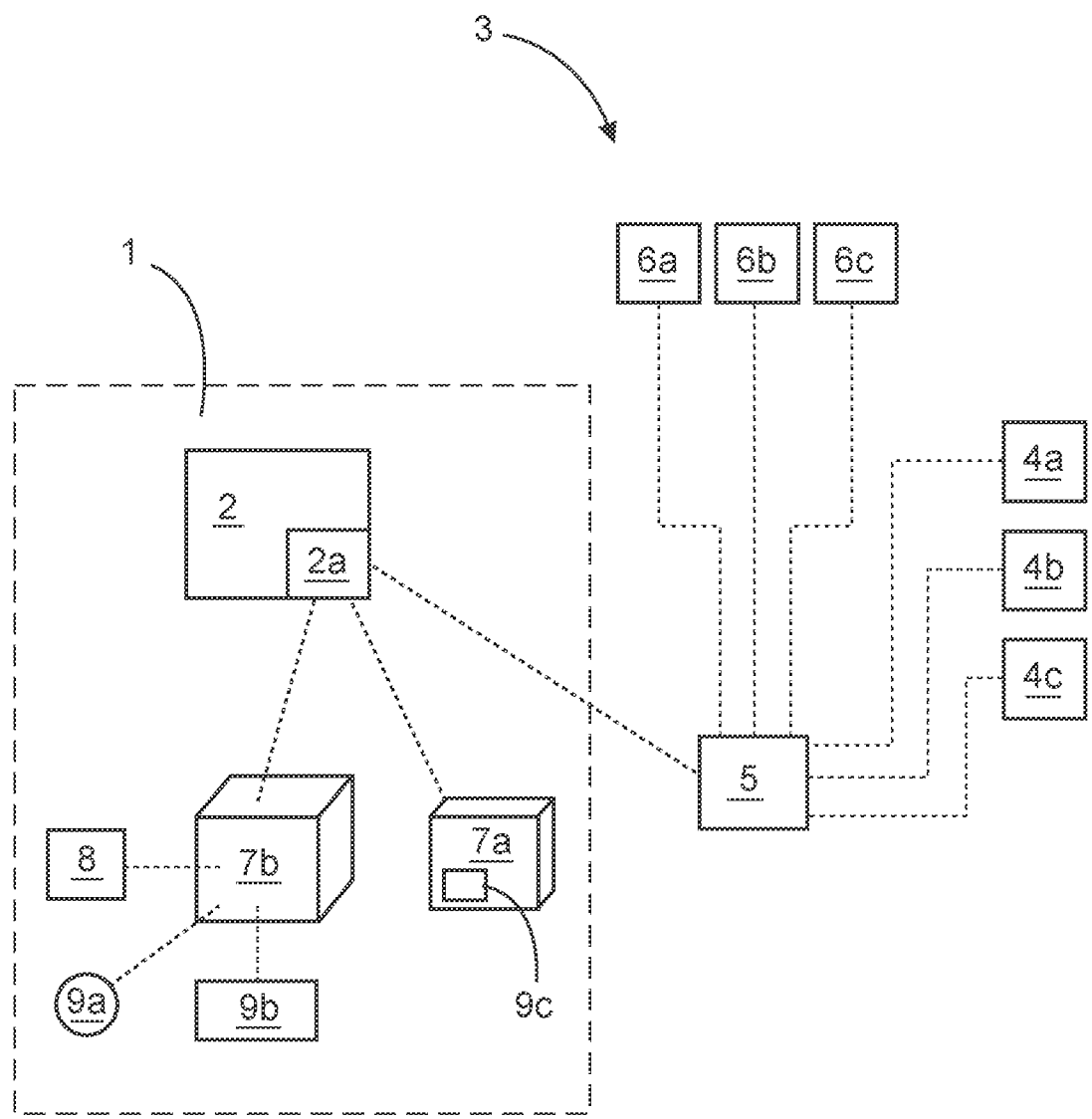
FIG. 1 illustrates a schematic representation not to scale of an embodiment of the industrial plant operator intervention system and of an industrial plant in accordance with the disclosure.

FIG. 1 illustrates a schematic representation not to scale of an industrial plant operator intervention system 1 according to the invention including a processing unit 2 configured to monitor and analyze industrial plant operation data to detect an anomaly in the industrial plant operation data that warrants initiating an operator intervention, and, in response to detecting the anomaly, automatically determine a user interface configuration of a user interface to be presented to a designated operator (not depicted) who is to perform the operator intervention. The user interface configuration is determined on the basis of technical context data, including industrial plant operation data associated with the anomaly, and on the basis of operator data pertaining to the designated operator, in such a manner that an anomaly-related and operator-specific user interface configuration is obtained.

The system may be configured for use with an industrial plant 3, which includes several pieces of equipment 4a, 4b, 4c. The industrial plant may optionally further comprise at least one control device 5 configured to control and/or monitor operation of the industrial plant.

The system may be configured to monitor and analyze industrial plant operation data. The system may be configured such that the processing unit receives the plant operation data at least in part from the control device 5. Industrial plant operation data may at least in part be based on measurements performed by sensors 6a, 6b, 6c detecting operating parameters for at least some of the industrial plant's pieces of equipment during plant operation. The measurement data may be provided by the sensors to the control device 5, which may optionally process the measurement data, and pass on the, optionally processed, measurement data. Alternatively or in addition, measurement data by be provided by the sensors directly to the processing unit 2. It is noted that the system may comprise the control device and/or the sensors or they may be external to the system.

The processing unit may comprise a communication interface 2a for providing user interface configuration data to one or more display devices 7a, 7b, which may be part of the system or external to the system, and/or for exchanging data with the control device. In the present example, two display devices are shown, but there may also be fewer or more display devices. In FIG. 1, merely as a non-limiting example, the display devices are shown as being part of the system. One or both may be external to the system. Moreover, in FIG. 1, the display devices 7a and 7b are shown as different types of display devices with a different screen size, one display device 7b being a table-top monitor, the other being a mobile device 7a having a touch screen. However, the display devices may each also be of any other type and may optionally both be of the same type.

FIG. 1 also shows an optional eye-tracking device 8 and optional user input elements, i.e., a mouse 9a and a keyboard 9b connected to the display device 7b to allow operator interaction with the user interface displayed on the respective display device. Moreover, FIG. 1 schematically shows a user interface including a user input element 9c displayed on the display device 7a and allowing for operator interaction with the user interface via touch input.

Figure 2A:
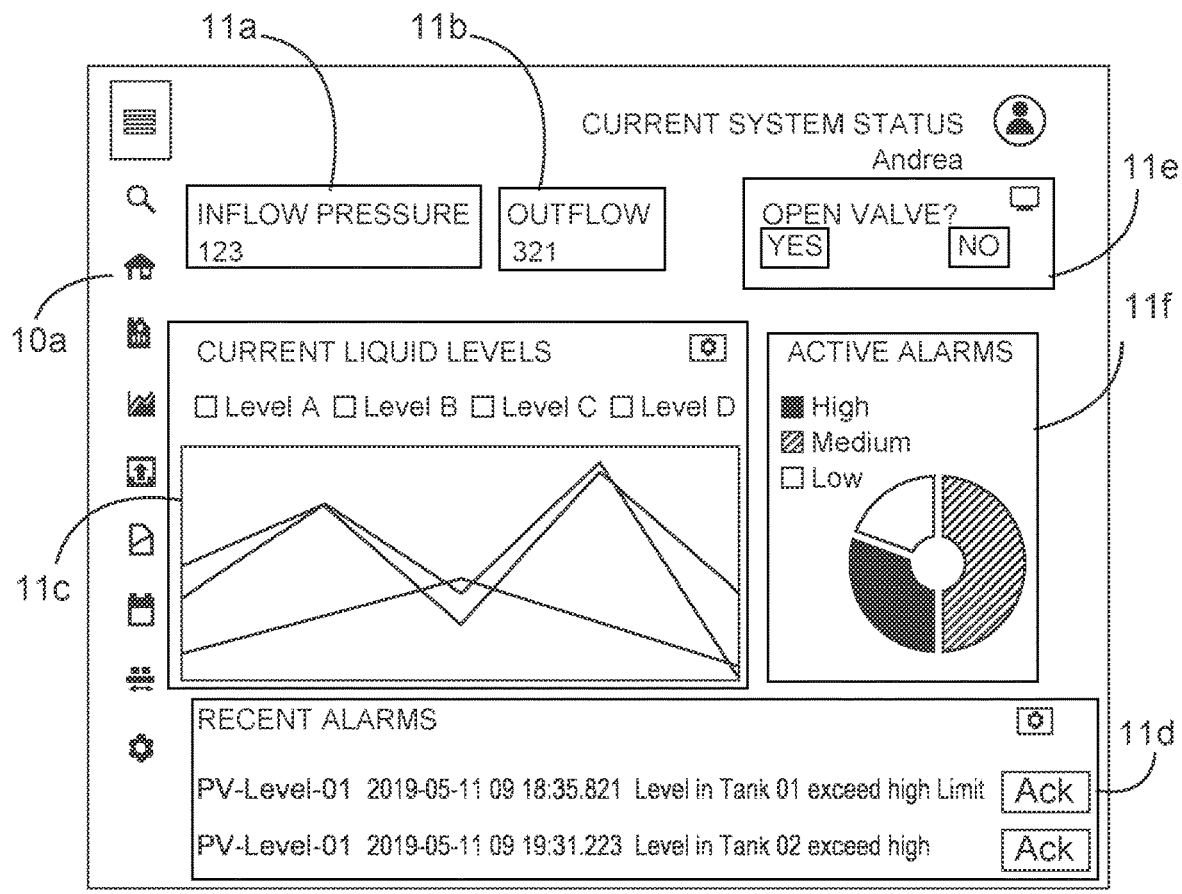
FIGS. 2a and 2b illustrate schematic representations of two user interfaces with different configuration in accordance with the disclosure.
Figure 2B:
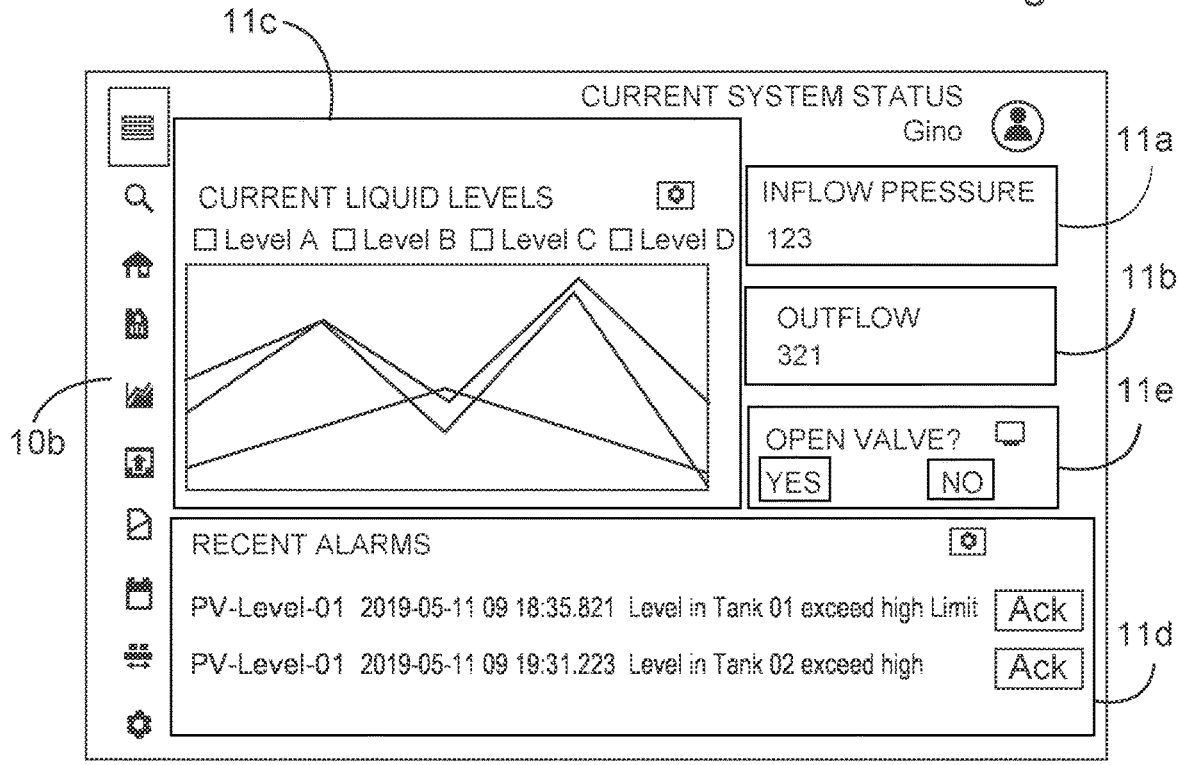

FIG. 2a shows an example of a displayed user interface 10a, wherein the configuration of the user interface was determined for a first operator, and FIG. 2b shows an example of a displayed user interface 10b, wherein the configuration of the user interface was determined for a second operator having operator data that is different from that of the first operator. It is noted that the user interfaces shown in FIGS. 2a and 2b are merely for illustrative purposes any may be much more complex in reality.

The user interfaces each include the user interface elements 11a, 11b, 11c, 11d, and 11e, which, in this example, are a box 11a visualizing inflow pressure 11a, a box 11b visualizing outflow, a graph showing current liquid levels 11c, an interface element listing recent alarms 11d and including interactive interface sub-elements "Ack" that allow for the user to interact with the user interface. Furthermore, both user interfaces include the user interface element 11e that allows for the user to select whether or not to open a valve. The user interface 10a has an additional user interface element 11f, which includes a visualization of active alarms and their priority (high, medium low) and is not included in the user interface 10b. Moreover, the arrangement of the different user interface elements is different for the different user interfaces.

For sake of simplicity, it is assumed that the technical context data, including the industrial plant operation data, on which the configuration of the user interface is based, are such that they would not lead to different user interface configurations, e.g. may be the same.

The reason for the user interfaces being configured such that they include at least a subset of the user interface elements 11a to 11f may be that the system determined that at least some of said user interface elements are related to the detected anomaly based on technical context data, in particular plant operation data. For example, the system may already have determined that the anomaly may be associated with current inflow pressure, outflow, and/or liquid levels, and that a specific valve may be associated with the anomaly.

Reasons for the different user interface configurations may entail that the system, having accessed the operator data pertaining to the first and second operator, respectively, determined that the first operator uses a first device and the second user uses a second device and that the first and second devices have different screen ratios. Furthermore, the operator data pertaining to the first operator and the second operator, respectively, indicated, that for one of the operators the user interface element 11f including a visualization of active alarms and their priority is not required whereas it is required for the other operator. For example, the system may have determined, based on the operator data, that one of the operators historically has accessed a visualization of active alarms repeatedly whereas the other operator has seldom or never accessed it or even repeatedly removed from the user interface. Alternatively, the system may have determined, based on the operator data, that one of the operators is more experienced than the other and may, based on the experience, know how to utilize the information contrary to the other user, or, alternatively, that one user may not require the additional information due to his experience.

A non-limiting example for the computer-implemented method according to the invention is provided below. It may be carried out by means of the industrial plant operator intervention system described above in the context of FIG. 1 or any other suitable system.

The method comprises monitoring and analyzing industrial plant operation data to detect an anomaly in the industrial plant operation data that warrants initiating an operator intervention. The monitoring may be performed, for example, by the above-described processing unit 2, for example on the basis of data received from the control device 5 described above and/or received from sensors, for example sensors 6a to 6c described above. For example, the sensors may obtain operation data for the pieces of equipment of the plant, e.g., the pieces of equipment 4q 4b, and 4c, and provide said data to a controller and/or to the processing unit.

In response to detecting the anomaly, a user interface configuration of a user interface to be presented to a designated operator who is to perform the operator intervention is automatically determined, for example by means of the processing unit.

The method may comprise automatically determining the designated operator, for example based on availability and/or a suitability of available operators.

The user interface configuration is determined on the basis of technical context data, including industrial plant operation data associated with the anomaly, and on the basis of operator data pertaining to the designated operator, in such a manner that an anomaly-related and operator-specific user interface configuration is obtained.

The industrial plant operation data associated with the anomaly may be automatically determined, for example on the basis of whether industrial plant operation data was temporally or locally associated with the anomaly.

As an example, the determination on the basis of the operator data may include evaluating one or more operator attributes indicating a skill set, area of operation, level of experience, and/or past involvement in industrial plant operation, of the designated operator. Alternatively or in addition, a match score calculated based on one or more of the operator attributes and based on the type of anomaly and/or part of the industrial plant affected by the anomaly and/or pieces of equipment affected by the anomaly may be evaluated. Alternatively or in addition, preferences set by the designated operator and/or automatically derived from preceding operator behavior of the designated operator may be evaluated. Alternatively or in addition, data indicating one or more display devices the designated operator is currently using or is expected to use for displaying the user interface are evaluated. Alternatively or in addition, data pertaining to preceding operator behavior of the designated operator and/or current operator behavior of the designated operator, in particular behavior patterns of the designated operator.

As an example, the method may comprise retrieving data from a database with data pertaining to the designated operator.

Alternatively or in addition, the method may comprise determining, particularly monitoring, current operator behavior of the designated operator. This may be done, for example, by means of the eye-tracking device 8 and/or any camera and/or sensor observing the operator. Alternatively or in addition, this may be done by means of tracking interactions of the operator via input elements, e.g., the input elements 9a, 9b, and 9c described above.

Any such behavior may also be stored, for example in an interaction database, for future use. It may also be associated in said database with the anomaly. Any such behavior may also be used for successively adapting the user interface configuration.

The method may also optionally comprise determining which display device will be used for displaying the user interface, e.g. which of the display devices 7a and 7b described above, and retrieving technical data of said display device. The configuration of the user interface may take into account said technical data.

The method may also optionally comprise accessing data, for example stored in the interaction database of the designated operator and/or of another operator to determine whether it is possible to derive configuration preferences from interactions that occurred in the context of a similar anomaly.

The method may also optionally comprise accessing previously used user interface configurations of the designated operator and/or of another operator to determine whether it is possible to derive configuration preferences that occurred in the context of a similar anomaly Once a user interface configuration has been determined, the method may include automatically or in response to an operator input, displaying the user interface on the display device.

The method may comprise adapting the user interface configuration in real time, in particular in response to the current operator behavior of the designated operator and/or changes in the technical context data, in particular, the industrial plant operation data. Thus, a series of user interface configurations may be determined tailored for a given operator to address the anomaly at hand.

The method may optionally comprise prompting the designated operator to provide feedback indicating the suitability of the user interface configuration for the operator intervention and/or to set the user interface configuration as a candidate or default user interface configuration for future use. The prompt may be provided on the display device and the user may provide feedback via one or more user input elements, e.g., user input elements 9a to 9c.

The method may also optionally comprise that the system automatically generates feedback indicating the suitability of the user interface configuration for the operator intervention, in particular by monitoring the current operator behavior of the designated operator and/or indicators as to how much time was required to perform the operator intervention.

The feedback may be stored and/or used to update operator data, particularly operator preferences.

Another non-limiting example for a method that may be performed, for example, using the system described in the context of FIG. 1 or any other suitable system, will be described below with reference to FIG. 3.

Figure 3:
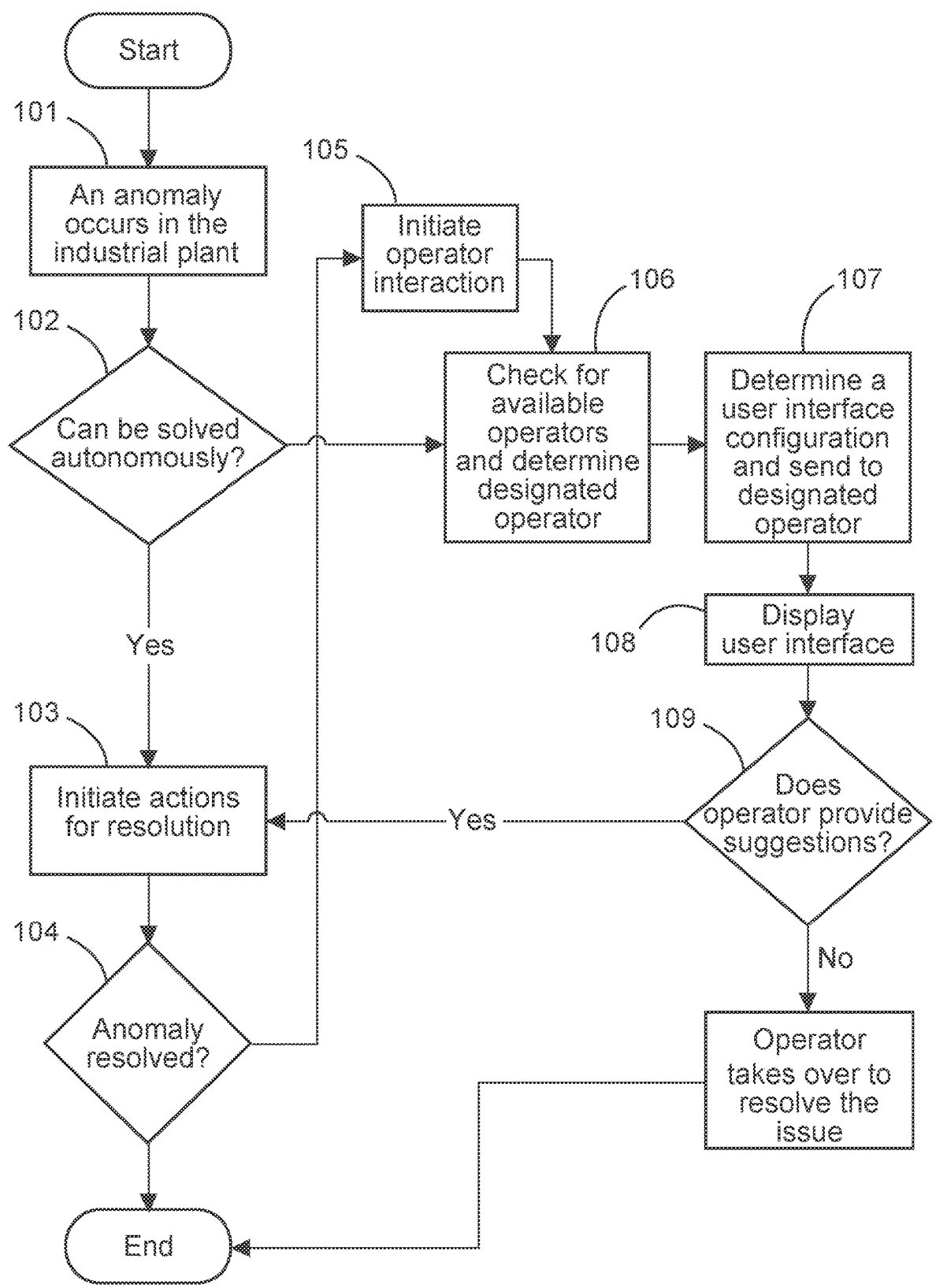
FIG. 3 illustrates a flow chart of an exemplary method in accordance with the disclosure.

As can be seen in FIG. 3, it is determined in step 101 that an anomaly occurs in the industrial plant and it is then determined, in step 102, whether the issue underlying the anomaly can be resolved autonomously. If so, respective actions for resolving the issue will be initiated in step 103 by the system. It is then determined whether the anomaly has been resolved in step 104. If this is the case, the method ends. If the system determines that the issue cannot be resolved autonomously or if the respective actions initiated automatically did not resolve the anomaly, it is determined that operator interaction is required and the system proceeds to initiate operator intervention in step 105. The system checks for available operators and determines a designated operator among the available operators to perform the operator intervention in step 106.

Subsequently an anomaly-related and operator-specific user interface configuration is determined on the basis of technical context data, including industrial plant operation data, associated with the anomaly and on the basis of operator data pertaining to the designated operator, and is sent to the designated operator in step 107. The user interface is presented to the operator by displaying it on a display device, or, in other words, rendering it on the screen of a display device in step 108.

The operator may then perform an operator intervention. The operator intervention may comprise that the operator takes steps that enable the system to proceed with further steps for resolving the anomaly autonomously. For example, the system may determine, in step 109, that the operator takes steps providing suggestions for the system as to how the system may autonomously proceed to resolve the anomaly. The system may then carry out steps autonomously based on the suggestions, i.e., the method may proceed to step 103 of the system initiating actions for resolving the anomaly. If the anomaly is still not resolved, the method returns to initiating operator intervention in step 105. If the operator does not provide suggestions, the method may proceed to step 110, wherein the operator takes all steps required to resolve the issue.

Figure 4:
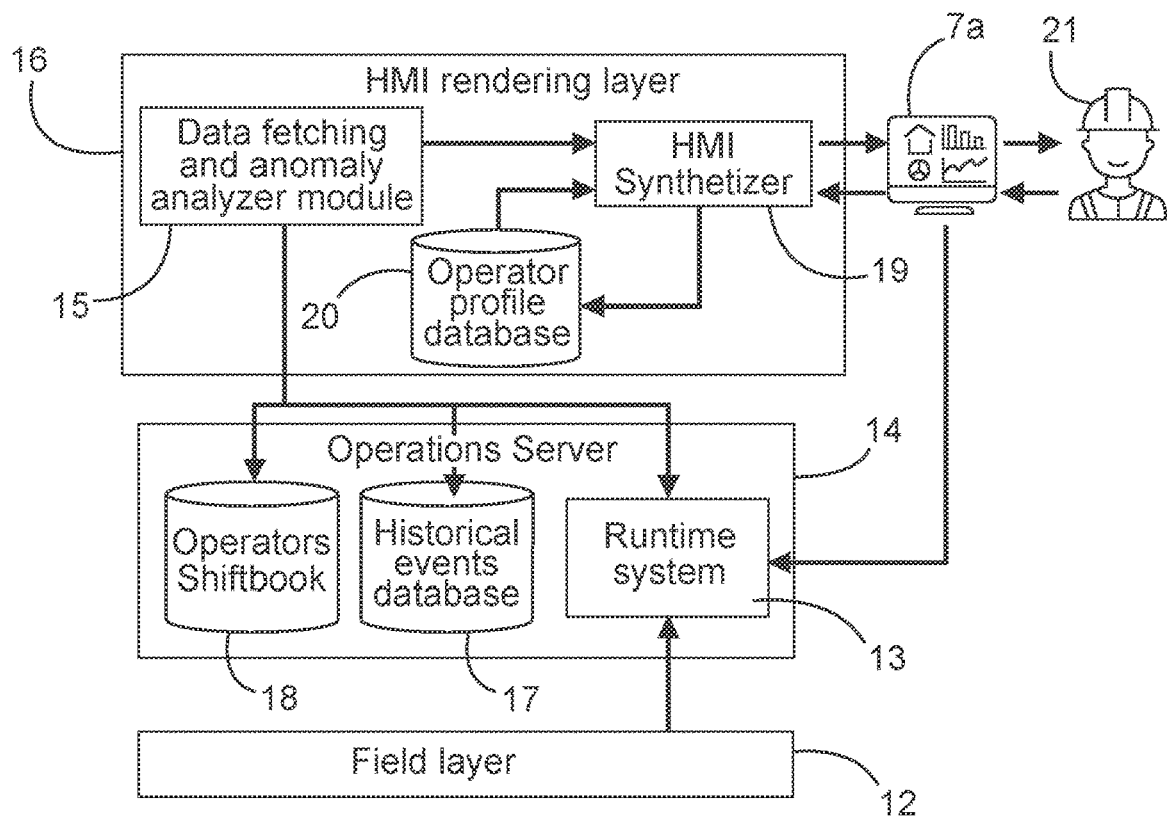
FIG. 4 illustrates a first schematic representation of an exemplary configuration of elements of the system and their interactions in accordance with the disclosure.

Another non-limiting example for a method that may be performed, for example, by the system described in the context of FIG. 1 or any other suitable system, will be described below with reference to FIG. 4.

The actual plant situation may be reported by a field layer 12 including pieces of equipment of the industrial plant, controllers and data acquisition modules to a runtime system 13, for example running on an operation server 14. The reporting may include reporting the operation data of the industrial plant. If the runtime system determines that an anomaly has occurred that cannot be resolved without operator intervention with a certain degree of confidence, for example because such an anomaly has not occurred before, it is determined that operator intervention is required.

A data fetching and anomaly analyzer module 15 that is part of an HMI rendering layer 16 fetches any available data around the anomaly. This may include historical events, e.g. from a historical events database 17, concerning the process variables involved in the issue. The data fetching and anomaly analyzer module may also retrieve information on operator availability, for example from an operators shiftbook 18 or a shift tracker tool. The historical events database and the operators shiftbook or shift tracker tool may also be located on the operations server. The data fetching and anomaly analyzer module may perform an analysis of the fetched data.

The fetched data and/or results of the analysis of the fetched data is provided by data fetching and anomaly analyzer module to an HMI synthesizer 19. The HMI synthesizer may retrieve operator data for at least one available operator, for example from an operator profile database 20 storing operator profiles that may each comprise one or more of personal preference settings, experience level of the user, and display device in use, among others. Before or after retrieving the operator data, the HMI synthesizer may determine the designated operator to perform the operator intervention and operator data on the designated operator is used by the HMI synthesizer, together with data pertaining to the anomaly, to automatically determine the user interface configuration so as to obtain an operator-specific and anomaly-related user interface configuration. The user interface may, for example, be a single page application web dashboard. The user interface, for example the web page, is then provided to the designated operator 21 and displayed on the display device 7a used by the designated operator. The HMI rendering layer may, for example, be implemented in the processing unit of the system according to the invention.

The designated operator may perform an operator intervention, for example directly by interaction with the user interface. The user interface may comprise one or more user interface elements allowing for immediate operator intervention. Preferably, the user interface configuration is such that the operator intervention is simplified, for example, such that the user only has to select a confirmation button and/or such that the user only has to make a selection between two choices, like "yes" or "no", "open" or "close", "start" or "stop". For example, the user interface may comprise a make-or-break button pertaining to certain process steps or states of pieces of equipment. It is preferable that there is a predetermined upper limit of user input elements, for example buttons, included in the user interface at any given time, for example, at most five user input element, preferably at most three user input elements, in particular, only one confirmation button and/or only two selection buttons for selection between two choices. In other words, the user interface may be configured to optimize for easy decision making by the user.

Interacting with the user interface may optionally entail that the designated operator modifies the user interface. Any interactions with the user interface, particularly modifications of the user interface made by the operator, may be tracked and recorded and taken into account for future automatic determinations of user interface configuration. The method may comprise receiving user input from the designated operator providing feedback on the suitability of the user interface for the operator intervention, in particular, of the perceived effect of the user interface configuration on the efficiency of operator intervention. Alternatively or in addition, for example based on how long it took the operator to resolve the issue, feedback on the suitability of the user interface for the operator intervention may be automatically provided. Any such feedback may be stored for use in future automatic determinations of user interface configurations. In particular, the feedback may be used to update a user profile of the designated operator and taking it into account, as part of the operator data, when the same operator performs an operator intervention in the future.

Figure 5:
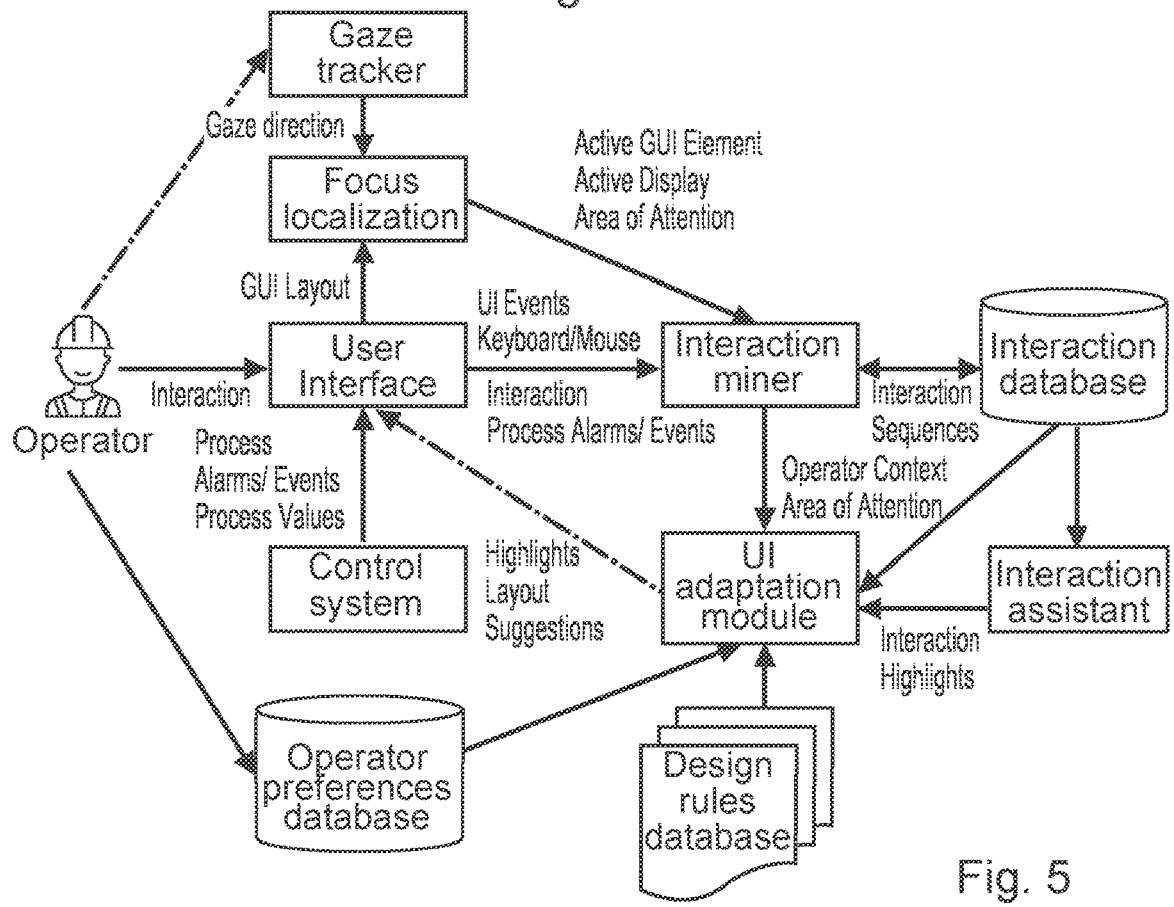
FIG. 5 illustrates a second schematic representation of an exemplary configuration of elements of the system and their interactions in accordance with the disclosure.

In FIG. 5, it can be seen how the user interface and various elements of the industrial plant, particularly of the industrial plant operator intervention system, may interact. For example, an operator may perform interactions with the user interface. Moreover, a control system of the industrial plant may provide process alarms, events, and process values to be used for configuring the user interface and potentially for being rendered as part of the user interface. Using the current user interface (also referred to as graphical user interface, GUI) layout and a gaze tracker tracking the gaze of the operator, focus localization of the operator may be performed and, based thereon, an active GUI element, active display, and/or area of attention may be provided to an interaction miner by the focus localization. Moreover, UI Events, keyboard interaction, mouse interaction and potentially an process alarms and events may be provided to the interaction miner. The interaction miner may provide interactions and interaction sequences to an interaction database.

A UI adaption module may receive operator context, e.g., area of attention, from the interaction miner. In addition, it may receive data from the interaction database directly or via an interaction assistant that provides interaction highlights. In addition, the UI adaption module may also receive design rules from a design rules database and/or operator preferences from an operator preferences database, which may have received operator preferences from the operator. Based on the information received from the interaction miner, interaction database, interaction assistant, design rules database, and operator preferences database (if any), the UI adapting module determines the configuration of the UI to be displayed, particularly, the adaptions to be made to the user interface configuration. Shown here, as an example, the user interface configuration may be adapted by highlighting layout suggestions.

Making reference to FIGS. 6a to 6c, another example for a system and method will be described below, wherein the configuration of the user interface is determined on the basis of data pertaining to designated operator, wherein the data includes data pertaining to current and previous operator behavior.

For sake of brevity and readability, the method steps will be described grouped in three phases, i.e., a learning phase, an operation phase, and an optimization phase. This is a non-limiting example the method of the invention need not have all three phases and that each of the phases may be different from the ones described below. Moreover, the numbering does not necessarily imply chronological order. One or more of the phases may also overlap temporally and/or in terms of the steps performed for the respective phase.

In the learning phase, the context is identified, e.g. priority of an upcoming event or alarm associated with a detected anomaly. Subsequently, associated with the context and the operator's preferences, the operator interactions with the system are tracked, for example: gaze of the operator, duration looking on elements of the user interface, mouse clicks, keyboard presses, windows opened, and/or entered values. Interaction sequences are generated, which are stored in an interaction database together with the respective event or alarm. As new events or alarms occur, e.g., associated with newly detected anomalies, the similarity of the new context compared with entries in the interaction database is determined and data gathering as described in previous step is repeated. If the event or alarm associated with a newly detected anomaly resembles previous ones, the interaction sequence in the interaction database is updated. Else, an additional interaction sequence is created in the interaction database and associated with the event or alarm. The system can track interactions of multiple operators over time, extracting the relevant interaction sequences.

FIG. 6a show a user interface and FIG. 6b shows an adapted user interface, the configuration of which is determined automatically by the system as outlined below.

In the operation phase, having assessed the priority of an upcoming event or alarm and identified, the system may detect the gaze location of the operator and determine the configuration of the user interface such that an event or alarm pop-up notification may is displayed within the gaze of the user. If the operator is not looking at any display at the moment, an additional acoustic signal may be output. Next, the system starts measuring the interactions and gaze duration on the newly displayed pop-up. If neither reaches "attention threshold", the user interface configuration may be adapted, e.g., the pop-up will gradually become more vivid, trying to attract more attention of the user. Examples of this behavior could be changing colors, increasing element size, animations like blinking or adding acoustic output. Attention attraction continues until "attention threshold" is reached via gaze or explicit interaction.

The system may also compare the current context with the entries of the interaction database. If there is a similar entry, it may determine a user interface configuration including an overlay to highlight elements that were considered previously. Based, for example, on operator data, e.g., level of expertise, this user interface including an overlay may be rendered automatically or only in response to being manually triggered by the operator. The user interface may be rendered, for example as shown in FIG. 6b, including, for example, user interface elements indicating the previously most gazed graphical elements as well as the textual content and previously performed user inputs (i.e. button click, keyboard press). A succession of such user interfaces may be rendered automatically, wherein the user interface is continuously adapted. The operator may be able to manually pause and resume this at any time. Accordingly, the user interface configuration is successively determined so as to provide interaction assistance. The above steps may be performed by an interaction assistant module.

The operator may trigger the interaction assistant module functionality at any time. Upon activation, the system may be configured to retrieve information from the interaction database and to activate contextual highlights. This helps the user gaining better awareness of the situation, supporting assessment of the current task, and thereby improving timeliness and reliability of the operator interactions.

Optionally, based on the operator interactions, the system will update the interaction database continuously in the background. This can be combined with (explicit) operator feedback or system performance indicators.

The optional optimization phase may be performed once or repeatedly. The optimization phase is represented in FIG. 6c. As the system learns which graphical elements and textual content is most interacted with, it can suggest alternative layouts that optimize representation of the information. The system automatically generates layout alternatives based on the interaction database and optionally based on design rules stored in the system. Examples of layout changes could be, increase size of buttons, or extend descriptions with additional lines, making textual information bold, rearranging windows and/or elements on the screen. The operator or alternatively a control system engineer may review the different suggestion, get a preview on the layout changes and acknowledge or discard each recommendation.

While the invention has been illustrated and described in detail in the drawings and foregoing description, such illustration and description are to be considered exemplary and not restrictive. The invention is not limited to the disclosed embodiments. In view of the foregoing description and drawings it will be evident to a person skilled in the art that various modifications may be made within the scope of the invention, as defined by the claims.

Thus, the user interface, or HMI, configuration may be seen as being created automatically ad-hoc or on the fly, rather than being pre-engineered.

An anomaly in the industrial plant operation data may be indicative of an event or technical issue, which, in the following, are sometimes collectively referred to as "issue" for sake of readability.

The types of issues that may have to be addressed by way of operator intervention, the means that allow for resolving the issue and/or the urgency of resolving the issues are manifold in an industrial plant and may also call for different operator interventions. The configuration of the user interface technically suitable for different operator interventions varies. This concerns different aspects of the user interface, for example, the selection of user interface elements that are advantageous for suitable intervention, the type and/or size and/or arrangement of the user interface elements, and/or the type of technical information provided by means of the user interface elements.

Furthermore, it is not always predictable which operator will perform the operator intervention. This applies essentially to all types of issues that require operator intervention, but particularly any unexpected issues that need resolving in a timely manner. In the latter case, availability of a specific operator or even of an operator having a specific training concerning this issue may not be guaranteed. The user interface required for an operator intervention concerning one particular issue may vary depending on the operator who is to perform the intervention.

As an example, an operator typically working in another part of the plant than the part where the issue arises will likely require different user interface elements than an operator working in the part of the plant where the issue arises. For example, if an operator is currently working in another part of the plant, they may not have access to certain terminals or other equipment that are present in the part of the plant where the issue occurs, so for responding in a timely manner it may be advantageous to provide a digital substitute for any such equipment and/or its functionality when configuring the user interface. In addition, it may also be advantageous to take into account various other operator-related aspects, for example, that different technical information may be required for resolving the issue depending on the skill set or experience of the operator to perform the operator intervention.

In terms of the operator who is to perform the operation, some of the above aspects are relatively static, for example the part of the plant where the operator usually works or the area of expertise, or the level of experience. Other aspects that also concern the operator are less static. For example, the operator may, at any given time, pay more or less attention to a specific alert provided by a user interface. The operator's attention may not even necessarily be directed solely at a user interface displayed on the display device they might use in the context of the operator intervention. The operator's attention, even if directed to a great extent at the user interface of the device, may also not necessarily be directed at user interface elements related to the issue that is to be resolved. For example, the operator may not necessarily focus their attention at a specific portion of the user interface, unless there is a motivation to do so. This may unnecessarily or even critically delay operator intervention.

The decision on a suitable configuration of the user interface, is immediately related to the technical issue to be addressed by the operator intervention. However, not all technical information that go into finding a suitable configuration are actually relevant for the operator intervention itself and resolving the issue. This means that in absence of the claimed system the operator will have to evaluate technical information that is at least in part irrelevant for the issue to be addressed, only for suitably configuring the user interface for the actual intervention.

As mentioned above, autonomous operation has become increasingly sophisticated, such that it has become technically feasible to perform a preliminary analysis of the technical data to determine the user interface elements, including representations of part of the industrial plant, for example part of the plant's configuration and current state, and/or user input elements. Accordingly, at the time when the operator starts interacting with a user interface, the user interface is already a much closer approximation of the most suitable configuration of the user interface than in any of the currently known systems. This significantly improves both quality and timeliness of the operator intervention.

In absence of the claimed system, any given operator who is to perform the operator intervention will have to make their own choices as to how to best handle the issue at hand. They may have to decide on a user interface configuration they deem suitable for addressing the issue or make do with a relatively unsuitable pre-engineered configuration. This is time consuming and also, specifically when the operator is inexperienced when it comes to the issue at hand, error-prone. Accordingly, issues may not be addressed at all or not in a timely manner, or may be addressed incorrectly, inefficiently, or unreliably. This in turn may even impede the operation of the plant, potentially even safety of the plant operation.

Thus, as can be seen from the above, taking into account technical context data, including industrial plant operation data, and operator data pertaining to the designated operator, and determining the user interface configuration in such a manner that an anomaly-related and operator-specific user interface configuration is obtained ensures that issues can be addressed correctly, efficiently, reliably and/or in a timely manner, thereby also improving reliability and safety of plant operation.

"Data pertaining to" something may include any information that serves to describe it, particularly its state and/or properties, in a manner that can be evaluated by a computing device. For example, data pertaining to an operator may comprise values representative of properties of the operator and/or current state of the operator. As another example, data pertaining to pieces of equipment may comprise values representative of properties of said pieces of equipment and/or values representative of the current state of the equipment.

The system may be at least partially integrated in a distributed control system. In particular, the processing unit may be part of said distributed control system. The distributed control system may also comprise an operator shift tracker tool that provides information on available operators on duty and/or the way to interact with them. The processing unit may also be referred to as an HMI rendering engine or user interface rendering engine.

Monitoring industrial plant operation data may include monitoring process variables of the current operation. For example, the system may be configured to monitor industrial plant operation data obtained from pieces of equipment of the industrial plant and/or from sensors and/or from controllers and/or from memory devices, wherein the sensors and/or controllers and/or memory devices may be part of or external to the system. Operation data may include, for example, level of pressure in different parts of the plant and/or pieces of equipment, e.g. in a pipe, and/or logical status of a piece of equipment, e.g. a valve.

Analyzing industrial plant operation data to detect an anomaly in the industrial plant operation data that warrants operator intervention may include determining that an anomaly occurred and that the system does not have the capability to autonomously intervene in such a manner that the anomaly is successfully addressed with sufficiently high confidence. For example, the system may determine a confidence score for addressing the anomaly successfully and in case the confidence score is below a predetermined threshold, which may vary depending on the anomaly, determine that operator intervention is warranted. The confidence score may depend on similarity of the detected anomaly and previously encountered anomalies, pieces of equipment involved, and/or complexity of the process affected by the anomaly, for example.

Determining the user interface configuration may comprise one or more of a selection of user interface elements to be included in the user interface, the type of each user interface element, the content of each user interface element, the placement of each user interface element, the size and/or the color scheme of each of the user interface elements. The user interface elements may include, for example, elements that visually represent operation data, e.g., plant layout including pieces of plant equipment, status of the pieces of plant equipment, graphs representing values related to the plant operation, and/or process flowcharts representing processes of the current operation. Alternatively or in addition, the user interface elements may include input elements for example buttons, text-entry boxes, and/or dropdown menus.

Exemplary user interface elements may include static or animated elements, interactive elements, overlays, notification elements, e.g. pop-up windows, highlighting elements, user prompts, and/or contextual help.

The term "designated operator" refers to an operator that the system determines will be the operator performing the operator intervention. Optional examples for how the designated operator may be determined are provided below.

Presenting the user interface may comprise displaying the user interface on one or more display devices or, in other words, rendering the user interface on the screen of one or more display devices. In particular, the user interface may be rendered in its entirety on a single screen. Alternatively or in addition, the user interface may be configured as a single-view user interface, for example a dashboard. The user interface may be provided and rendered as a web page. The system may comprise the one or more display devices or they may be external to the system.

The system may be configured to prompt the one or more display devices to display the user interface automatically or in response to a confirmation from the designated operator.

An operator intervention, as briefly mentioned above, may comprise that the operator interacts with the user interface. Alternatively or in addition, the operator intervention may comprise that the operator, in response to the user interface being presented to the operator, interacts with one or more pieces of equipment of the industrial plant and/or with the system and/or with the user interface displayed on the screen of the one or more display devices.

An anomaly-related user interface configuration is a user interface configuration that depends on the technical context data, particularly the industrial plant operation data, associated with the anomaly. When all other factors taken into account for configuring the user interface, in particular operator data, are the same, the user interface configuration may not be the same for different technical context data, particularly the industrial plant operation data, associated with the anomaly. Thus, the user interface configuration may be different for different detected anomalies, in particular, may be different for different types of detected anomalies and/or different pieces of equipment affected by the detected anomalies and/or different parts of the industrial plant and/or process affected by the anomaly.

Technical context data, in particular industrial plant operation data, associated with the anomaly may include plant operation data at the time of detecting the anomaly, particularly operation data in a time interval, for example of predetermined size, including the time of detecting the anomaly and including times before detecting the anomaly and/or time after detecting the anomaly and up to determining the user interface configuration. Alternatively or in addition, the technical context data, particularly industrial plant operation data, associated with the anomaly may include portions of the plant operation data that pertain to pieces of equipment of the industrial plant that are affected by the anomaly, particularly operation data of said pieces of equipment. The plant operation data pertaining to a piece of equipment may include operation parameters of said piece of equipment. The system may be configured to determine whether or not a piece of equipment is affected by the anomaly by determining whether operation parameters of said piece of equipment are within an acceptable range and/or above or below a given threshold.

An operator-specific user interface configuration is a configuration that is determined for each operator individually taking into account operator data of the respective operator. In other words, when all other factors taken into account for configuring the user interface, in particular technical context data, particularly plant operation data, are the same, the user interface configuration may not be the same for two operators whose operator data differs. For example, for a given anomaly, the user interface configuration different operators whose operator data differs may be presented with differently configured user interfaces. It is noted that the operator data may be subject to changes over time. In this case, when all other factors taken into account for configuring the user interface, in particular plant operation data, are the same, the user interface configuration may not be the same even for the same operator before and after changes to the operator data.

The technical context data may provide, in addition to the industrial plant operation data, additional data pertaining to technical context that determines the potential operator interventions. Technical context data may comprise time of day, lighting conditions in the operator's environment, noise level in the operator's environment, number of active display devices, number of active alarms, ranking of alarms, priority of alarms, severity of situation, batch phase, and/or equipment status.

The system may be configured to determine technical context data by applying predetermined criteria for ranking and/or prioritizing alarms and/or events, e.g., for identifying of high priority alarms and/or events. This type of context data may be used in configuring the user interface for determining which user interface elements are important enough to be included in the user interface and/or to determine their placement in the user interface and/or to determine any highlights applied in the user interface.

It is to be understood that determining the configuration of the user interface may, in addition to technical context data and operator data, also be based on general principles, best practices, and/or norms for user interface design and/or on an interaction database.

The operator data pertaining to the designated operator may include at least one of: one or more operator attributes indicating a skill set, area of operation (e.g., expertise with different parts of the plant and/or part of the process), level of experience, and/or past involvement in industrial plant operation (e.g., type of past operations in which the operator was involved and/or amount or frequency of operator involvement), of the designated operator; a match score calculated based on one or more of the operator attributes and based on the type of anomaly and/or part of the industrial plant affected by the anomaly and/or pieces of equipment affected by the anomaly; preferences set by the operator and/or automatically derived from preceding operator behavior of the designated operator, in particular from previous operator interactions of the designated operator with the system; data indicating one or more display devices the designated operator is currently using or is expected to use for displaying the user interface; and data pertaining to preceding operator behavior of the designated operator and/or current operator behavior of the designated operator, in particular behavior patterns of the designated operator.

The match score may be calculated based on one or more of the operator attributes and the detected anomaly, for example the type of anomaly and/or part of the industrial plant affected by the anomaly and/or pieces of equipment affected by the anomaly. The match score may indicate how well the operator attributes match the type of anomaly and/or part of the industrial plant affected by the anomaly and/or pieces of equipment affected by the anomaly. The system may be configured to calculate the match score once an anomaly occurs for said specific anomaly and/or to calculate one or more match scores for potential anomalies and save the one or more match scores. In that case, the system may be configured to, in response to detecting an anomaly, identify the match score corresponding to the potential anomaly that is most similar to the detected anomaly as the match score to be used for determining the configuration of the user interface and/or for automatically determining the designated operator.

As mentioned above, the operator data of an operator may include data pertaining to preferences automatically derived from preceding operator behavior of the designated operator, in particular from previous operator interactions of the designated operator with the system. This may include, for example, data pertaining to interaction of the operator with user interface elements, particularly number and/or frequency of interactions with the respective interface elements, and/or operation data previously accessed by the operator, particularly number and/or frequency of accesses.

In general, operator behavior of an operator, for example of the designated operator, may include one or more operator interactions of the operator with the system, particularly with the user interface, in particular a series of interactions of the operator with the system, particularly the user interface. Alternatively or in addition the operator behavior may include state of attention of the designated operator, for example focus of attention of the operator and/or level of attention of the operator. In particular, the state of attention may comprise a lack of attention the operator pays to the user interface as a whole or part of the system, particularly the user interface, in particular lack of interaction with the system, particularly with the user interface or part of the user interface and/or lack of focus on a specific region of the user interface.

In general, data pertaining to current operator behavior of an operator, in particular the designated operator, refers to data pertaining to operator behavior that occurs after detecting the anomaly that warrants operator intervention. In general, data pertaining to preceding operator behavior of an operator, in particular the designated operator, refers to data pertaining to operator behavior that has occurred before detecting the anomaly that warrants the operator intervention. This may include, for example, operator behavior in response to a prior anomaly that warranted operator intervention, particularly in the course of an operator intervention performed by the operator in response to the prior anomaly being detected.

In particular, the data pertaining to preceding operator behavior on which the determination of the user interface generation is based may comprise data pertaining to preceding operator behavior that occurred in the context of a prior anomaly that is similar to the detected anomaly. For example, the preceding operator behavior may include an operator intervention performed in response to detecting said similar anomaly and/or one or more operator selections pertaining to a configuration of the user interface made in the context of the operator intervention performed in response to detecting said similar anomaly.

In other words, data pertaining to preceding operator behavior may include previously used user interface configurations. The system may be configured to determine that a detected anomaly is similar to a previous anomaly on the basis of operation conditions associated with the detected anomaly and the previous anomaly, for example, if the difference between one or more of the operation conditions is below a predetermined threshold. More details on the current and preceding operator behavior will be provided further below.

When taking into account current operator behavior of the designated operator, the situational awareness of the operator may be improved. That is, by providing a proper user interface configuration, the operator may be made aware of the anomaly that requires operator intervention and/or data aiding in performing the intervention. Thereby, timeliness and reliability of the operator intervention is improved.

As mentioned above, the operator data may include data indicating one or more display devices the designated operator is currently using or is expected to use for displaying the user interface. The system may be configured to retrieve technical data of said one or more display devices. The system may be configured to determine the user interface configuration on the basis of one or more of the technical data of said one or more display devices, in addition to the technical context data, including industrial plant operation data, and operator data pertaining to the designated operator. The technical data of the one or more display devices may include data pertaining to the type of device, for example, mobile device, tablet, laptop, screens that are provided integrally with pieces of equipment of the plant, and/or stand-alone monitors, e.g., table-top monitor or wall-mounted monitor.

Alternatively or in addition, technical data of the one or more display devices may include size and shape of the screen of the respective display device and/or of color rendering abilities of the respective display device and/or resolution of the respective display device and/or data pertaining to input modes of the respective display device and/or data pertaining to data transmission capabilities of the respective display device and/or data pertaining to access restrictions of the respective display device.

It is often not predictable which display device, particularly what type of display device, will be used to display the user interface for the operator intervention. This may depend, for example, on device-availability at the time of operator intervention. In view of different technical specifications of the potential devices, it is advantageous to provide automatic configuration of the user interface in accordance with the device at hand. For example, the selection of user interface elements and/or their arrangement and/or their size may vary depending on the device.

As mentioned above, the operator data pertaining to the designated operator may include data pertaining to preceding and/or current operator behavior of the designated operator, in particular behavior patterns of the designated operator.

The system may be configured to determine, particularly monitor, current operator behavior of the designated operator and optionally to store, for example for future use as data pertaining to preceding operator behavior, data pertaining to the current operator behavior of the designated operator. In particular, the system may be configured to determine, particularly monitor and optionally to store the state of attention of the designated operator and/or interactions of the designated operator with the system. The system may comprise a memory device configured to store the data pertaining to the current operator behavior.

For example, for determining the current operator behavior, the system may comprise an eye-tracking device configured to determine the direction of gaze and/or field of view of the operator. Alternatively or in addition, for determining the current operator behavior, the system may comprise a tracking functionality for determining operator interaction with the user interface via user input elements, for example mouse movements, mouse clicks, and/or touch input. Alternatively or in addition, for determining the current operator behavior, the system may comprise equipment, for example including a camera and an image recognition engine, allowing for detecting the operator's posture, e.g. sitting or standing, and/or the operator's position and/or the operator's orientation and/or the operator's movements. As an example, the system may be configured to monitor the direction of gaze and/or field of view of the operator and/or operator interaction with the user interface via user input elements and/or the operator's position and/or orientation and/or posture and/or movements, and, based thereon, determine state of attention, e.g., the focus and/or level of attention, of the operator.

An example of determining the user interface configuration based on data pertaining to the current operator behavior will be described below. The operator behavior may be indicative of whether or not the operator is focusing on the user interface, particularly a portion of the user interface, that the system automatically determined as being particularly relevant for the operator to address the issue to be addressed by the operator intervention. The system may be configured to, in response to determining that the operator is not focusing on the user interface, particularly a portion of the user interface, that the system automatically determined as being particularly relevant, determine the configuration of the user interface in such a manner that visual cues are included to direct the operator's attention to the user interface, particularly a portion of the user interface, that the system automatically determined as being particularly relevant. As an example, the saliency of an element in said region may be increased, e.g., by changing color, contrast, and/or size of a user interface element in said region or by adding an animation in said region. Alternatively or in addition, the system may be configured, in response to determining that the operator is not focusing on a user interface element that the system automatically determined as being particularly relevant for the operator to address the issue to be addressed by the operator intervention, to determine the configuration of the user interface in such a manner that said user interface element is placed in a portion of the user interface that the to which the focus of attention of the designated operator is currently directed. For example, the system may be configured to determine the direction of gaze and/or field of view of the operator and place said user interface element along the direction of gaze and/or within the field of view of the operator.

As mentioned above, the system may be configured to store data pertaining to the current operator behavior for future reference, particularly, as the above-mentioned data pertaining to preceding operator behavior. For example, the system may be configured to store, for example in a database, data pertaining to operator behavior associated with an anomaly, e.g., operator behavior in response to the anomaly being detected. The operator behavior may comprise data indicative of an interaction or a sequence of interactions of the operator with the system, particularly with the user interface, associated with the anomaly, in particular in response to the anomaly being detected. The system may be configured to store data pertaining to the anomaly, for example operation data associated with the anomaly and/or a type of anomaly and/or a priority of an anomaly, and the data pertaining to the operator behavior associated with the anomaly in such a manner, that the data pertaining to the anomaly and the data pertaining to the operator behavior associated with the anomaly are correlated.

In particular, the data pertaining to the anomaly and the data pertaining to the operator behavior associated with the anomaly may be stored such that the system is able to retrieve the data pertaining to the operator behavior associated with the anomaly when a newly detected anomaly is the same or a similar to the anomaly. This may be performed for one or more anomalies. The retrieving may comprise comparing data pertaining to a newly detected anomaly to stored data pertaining to the one or more anomalies and determining the operator behavior associated with an anomaly among the one or more anomalies that is the same or similar to the newly detected anomaly. The determined operator behavior may then be used for determining the user interface configuration in response to the newly detected anomaly.

Alternatively or in addition, the system may also be configured to store a user interface configuration associated with the anomaly and/or associated with operator behavior in such a manner that the system can retrieve the stored user interface configuration when a newly detected anomaly and/or a newly detected operator behavior are the same or similar to the anomaly and/or operator behavior associated with the stored user interface configuration. The system may be configured to retrieve the stored user interface configuration and to base the user interface configuration determined in response to the newly detected anomaly on the stored user interface configuration. The system may be configured to, in the process of determining the user interface configuration in response to the newly detected anomaly, adapt the stored user interface on the basis of other data pertaining to the designated operator and/or technical context data.

As an example, the system may be configured to learn, in a given situation, the operator behavior by monitoring operator behavior, like clicks and gaze, at the time when the operator performs an operator intervention, specifically, when the operator responds to alarms and/or events associated with the detected anomaly. The learning may include associating the monitored behavior with the given situation, e.g., the detected anomaly, such that when a similar situation arises in the future, the user interface may be configured so as to suggest similar solution strategies in a personalized layout to the operator to assist them in resolving the situation.

The system may be configured to determine the configuration of the user interface also based on data pertaining to preceding operator behavior of another operator sharing operator attributes with the designated operator.

As an example, the system may be configured to determine that designated operator shares more than a predetermined number of operator attributes and/or a predetermined subset of operator attributes with another operator, retrieve operator data of said other operator including data pertaining to preceding operator behavior of said other operator, and use the data pertaining to preceding operator behavior of said other operator to determine the configuration of the user interface. This may be done in addition to or instead of using data pertaining to preceding operator behavior of the designated operator to determine the configuration of the user interface. Using data from another operator allows for leveraging information collected in similar situations for similar operators, particularly similar operators with more experience or with a more extensive record of operator behavior. Thereby, experience may be transferred in a meaningful way between users.

The system may be configured to prompt the designated operator to provide feedback indicating the suitability of the user interface configuration for the operator intervention and/or to set the user interface configuration as a candidate or default user interface configuration for future use. Alternatively or in addition, the system may be configured to automatically generate feedback indicating the suitability of the user interface configuration for the operator intervention, in particular by monitoring the current operator behavior of the designated operator and/or indicators as to how much time was required to perform the operator intervention.

The feedback may be stored and/or used to update operator data pertaining to the designated operator, particularly operator preferences, and subsequently used for automatically determining the user interface configuration.

For example, the system may be configured to prompt the designated operator to provide feedback, e.g. via a user input, the feedback indicating whether the user interface configuration met the requirements for successful operator intervention, optionally by means of a rating system. Alternatively or in addition, the system may be configured to prompt the designated operator to provide feedback indicating how future user interface configurations may better meet requirements for successful operator intervention. Alternatively or in addition, the system may be configured to automatically generate feedback whether the user interface configuration met the requirements for successful operator intervention and/or how future user interface configurations may better meet requirements for successful operator intervention by monitoring the current operator behavior of designated operator, in particular interaction of the designated operator with the system, and/or indicators as to how much time was required to perform the operator intervention. Previously received feedback from an operator and/or the system may be used in determining the user interface configuration when an anomaly warranting operator intervention occurs. Thus, the system may over time improve determination of the user interface configuration.

The system may be configured to, in response to detecting the anomaly that warrants initiating an operator intervention, automatically determine the designated operator, in particular based on availability and/or a suitability ranking for the detected anomaly.

In particular, the system may be configured to determine available operators and select the designated operator among the available operators, and automatically deliver the user interface configuration to the display device of the designated operator. Delivering the user interface configuration to the display device of the designated operator may include contacting the designated operator.

The available operators may, for example, be determined based on any record that allows for determining whether an operator is supposed to be available, for example using a shift tracker tool tracking the shifts of operators and/or a tool tracking absence due to sick leave and/or vacation days. Each of said tools may be part of or external to the system.

The system may be configured to automatically determine the designated operator on the basis of operator data pertaining to the available operators. The system may use operator data for each of the available operators to rank suitability of the available operators to perform the operator intervention, thereby obtaining a suitability ranking. The suitability may, for example, be determined on the above-described match score. The system may be configured to determine one of the available operators to be the candidate designated operator, in particular based on the suitability ranking. For example, the available operator with the highest rank in the suitability ranking may be determined to be the candidate designated operator. The system is configured to determine that the candidate designated operator is the designated operator only in case the user interface is successfully delivered to the display device to be used for displaying the user interface, in particular, only in case successful delivery to the candidate designated operator is confirmed by the display device or by the candidate designated operator. In addition, the system may be configured to determine that the candidate designated operator is the designated operator only in response to a confirmation received from the candidate designated operator. The system may be configured to, in case the candidate designated operator cannot be determined to be the designated operator, select a new candidate designated operator, for example in descending order of the ranks in the suitability ranking. This may be repeated until a designated operator has been determined.

As mentioned above, the system may be configured to display the user interface automatically or in response to a confirmation from the designated operator. When the system is configured to display the user interface in response to a confirmation from the designated operator, the system may be configured to render a prompt to the designated operator on the display device to confirm that the user interface is to be displayed and, in response to the confirmation, display the user interface. The system may be configured to render a preview of the user interface or of part of the user interface alongside the prompt. The system may also be configured to automatically determine potential alternative user interface configurations of the user interface on the basis of the same criteria as the user interface and render previews of the alternative configurations in such a manner that the operator may select one of the alternative user interface configurations.

The system may be configured to adapt the user interface configuration in real time, in particular in response to the current operator behavior of the designated operator, for example interactions of the designated operator with the system, and/or in response to changes in the technical context data, for example the industrial plant operation data.

For example, the system may be configured to monitor the operator behavior of the designated operator and/or interactions with the system, particularly with the currently displayed user interface, and/or changes of the plant's operating conditions, and use the data obtained from the monitoring for adapting the user interface configuration in real time.

The invention also provides a computer-implemented method comprising monitoring and analyzing industrial plant operation data to detect an anomaly in the industrial plant operation data that warrants initiating an operator intervention and, in response to detecting the anomaly, automatically determining a user interface configuration of a user interface to be presented to a designated operator who is to perform the operator intervention. The user interface configuration is determined on the basis of technical context data, including industrial plant operation data, associated with the anomaly and on the basis of operator data pertaining to the designated operator, in such a manner that an anomaly-related and operator-specific user interface configuration is obtained.

The operator data pertaining to the designated operator may include at least one of one or more operator attributes indicating a skill set, area of operation (e.g., expertise with different parts of the plant and/or part of the process), level of experience, and/or past involvement in industrial plant operation (e.g., type of past operations in which the operator was involved and/or amount or frequency of operator involvement), of the designated operator; a match score calculated based on one or more of the operator attributes and based on the type of anomaly and/or part of the industrial plant affected by the anomaly and/or pieces of equipment affected by the anomaly; preferences set by the operator and/or automatically derived from preceding operator behavior of the designated operator, in particular from previous operator interactions of the designated operator with the system; data indicating one or more display devices the designated operator is currently using or is expected to use for displaying the user interface; and data pertaining to preceding operator behavior of the designated operator and/or current operator behavior of the designated operator, in particular behavior patterns of the designated operator.

The method may comprise determining, particularly monitoring, current operator behavior of the designated operator and optionally storing, for example for future use as the data pertaining to preceding operator behavior, data pertaining to the current operator behavior of the designated operator.

The configuration of the user interface may be determined based on data pertaining to preceding operator behavior of another operator sharing operator attributes with the designated operator.

The method may comprise prompting the designated operator to provide feedback indicating the suitability of the user interface configuration for the operator intervention and/or to set the user interface configuration as a candidate or default user interface configuration for future use, and/or automatically generating feedback indicating the suitability of the user interface configuration for the operator intervention, in particular by monitoring the operator behavior of the designated operator and/or indicators as to how much time was required to perform the operator intervention.

The method may comprise, in response to detecting the anomaly that warrants initiating an operator intervention, automatically determining the designated operator, in particular, based on availability and/or a suitability ranking of candidate operators for the detected anomaly.

The method may comprise adapting the user interface configuration in real time, in particular in response to the current operator behavior of the designated operator, for example interactions of the designated operator with the system, and/or in response to changes in the technical context data, for example the industrial plant operation data.

The disclosure also contemplates a computer program product comprising instructions which, when the program is executed by a computer, cause the computer to carry out any of the above methods.

The disclosure also contemplates a computer-readable medium comprising instructions which, when executed by a computer, cause the computer to carry out the method of any of the above methods.

The features and advantages outlined above in the context of the system similarly apply to the methods, the computer program product, and computer-readable medium described herein.

Further features, examples, and advantages will become apparent from the detailed description above making reference to the accompanying drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An industrial plant operator intervention system for use in an industrial plant, the system comprising:
  a processing unit, the processing unit being programmed and configured to:
    monitor and analyze industrial plant operation data to detect an anomaly in the industrial plant operation data that warrants initiating an operator intervention; and
    automatically determine a user interface configuration of a user interface to be presented to a designated operator who is to perform the operator intervention when the anomaly is detected,
    wherein the user interface configuration is determined on the basis of technical context data, including industrial plant operation data associated with the anomaly; and,
    on the basis of operator data pertaining to the designated operator, obtain an anomaly-related and operator-specific user interface configuration, wherein the operator data pertaining to the designated operator includes operator attributes indicating a skill set, area of operation, level of experience, and past involvement in industrial plant operation, of the designated operator, and a match score calculated based on the operator attributes and a type of the detected anomaly, wherein the match score indicates a match between the operator attributes and the type of anomaly, a part of the industrial plant affected by the anomaly, and pieces of equipment affected by the anomaly, and in response to detecting the anomaly, identifying a match score from a plurality of match scores, corresponding to a potential anomaly that is most similar to the detected anomaly as the match score to be used to automatically determine the user interface configuration to be presented to the designated operator.

2. The system of claim 1, wherein the operator data pertaining to the designated operator include at least one of:
the match score calculated based on a part of the industrial plant affected by the anomaly, and pieces of equipment affected by the anomaly;
preferences set by the designated operator and/or automatically derived from preceding operator behavior of the designated operator, including previous operator interactions of the designated operator with the system;
data indicating one or more display devices the designated operator is currently using or is expected to use for displaying the user interface; and
data pertaining to preceding operator behavior of the designated operator and/or current operator behavior of the designated operator including behavior patterns of the designated operator.

3. The system of claim 1, wherein the system is configured to determine and monitor current operator behavior of the designated operator and to store as the data pertaining to preceding operator behavior, data pertaining to the current operator behavior of the designated operator.

4. The system of claim 1, wherein the system is configured to determine the configuration of the user interface also based on data pertaining to preceding operator behavior of another operator sharing operator attributes with the designated operator and/or based on technical data of one or more display devices the designated operator is currently using or is expected to use for displaying the user interface.

5. The system of claim 1, wherein the system is configured to prompt the designated operator to provide feedback indicating the suitability of the user interface configuration for the operator intervention and/or to set the user interface configuration as a candidate or default user interface configuration for future use.

6. The system of claim 5, wherein the system is configured to automatically generate feedback indicating the suitability of the user interface configuration for the operator intervention by monitoring the current operator behavior of the designated operator and/or indicators as to how much time was required to perform the operator intervention.

7. The system of claim 1, wherein the system is configured to, in response to detecting the anomaly that warrants initiating an operator intervention, automatically determine the designated operator based on availability and/or a suitability ranking of candidate operators for the detected anomaly.

8. The system of claim 1, wherein the system is configured to adapt the user interface configuration in real time in response to the current operator behavior of the designated operator and/or in response to changes in the technical context data for the industrial plant operation data.

9. A computer-implemented method, particularly carried out by a system, the system comprising a processing unit, the method comprising:
using the processing unit to monitor and analyze industrial plant operation data to detect an anomaly in the industrial plant operation data that warrants initiating an operator intervention; and
in response to detecting the anomaly, automatically determining a user interface configuration of a user interface to be presented to a designated operator who is to perform the operator intervention,
wherein the user interface configuration is determined on the basis of technical context data, including industrial plant operation data associated with the anomaly, and on the basis of operator data pertaining to the designated operator, in such a manner that an anomaly-related and operator-specific user interface configuration is obtained, wherein the operator data pertaining to the designated operator includes operator attributes indicating a skill set, area of operation, level of experience, and past involvement in industrial plant operation, of the designated operator, and a match score calculated based on the operator attributes and a type of the detected anomaly, wherein the match score indicates a match between the operator attributes and the type of anomaly, a part of the industrial plant affected by the anomaly, and pieces of equipment affected by the anomaly, and in response to detecting the anomaly, identifying a match score from a plurality of match scores, corresponding to a potential anomaly that is most similar to the detected anomaly as the match score to be used to automatically determine the user interface configuration to be presented to the designated operator.

10. The method of claim 9, wherein the operator data pertaining to the designated operator include at least one of:
the match score calculated based on a part of the industrial plant affected by the anomaly and/or pieces of equipment affected by the anomaly;
preferences set by the designated operator and/or automatically derived from preceding operator behavior of the designated operator;
data indicating one or more display devices the designated operator is currently using or is expected to use for displaying the user interface; and
data pertaining to preceding operator behavior of the designated operator and/or current operator behavior of the designated operator including behavior patterns of the designated operator.

11. The method of claim 9, further comprising determining current operator behavior of the designated operator and storing as the data pertaining to preceding operator behavior, data pertaining to the current operator behavior of the designated operator.

12. The method of claim 11, wherein the determining of the current operator behavior is accomplished by monitoring the designated operator.

13. The method of claim 9, wherein the configuration of the user interface is also determined based on data pertaining to preceding operator behavior of another operator sharing operator attributes with the designated operator and/or based on technical data of one or more display devices the designated operator is currently using or is expected to use for displaying the user interface.

14. The method of any one of claim 9, further comprising:
prompting the designated operator to provide feedback indicating suitability of the user interface configuration for the operator intervention and/or to set the user interface configuration as a candidate or default user interface configuration for future use, and/or
automatically generating feedback indicating the suitability of the user interface configuration for the operator intervention by monitoring the current operator behavior of the designated operator and/or indicators as to how much time was required to perform the operator intervention.

15. The method of claim 9, further comprising:
in response to detecting the anomaly that warrants initiating an operator intervention, automatically determining the designated operator based on availability and/or a suitability ranking of candidate operators for the detected anomaly, and/or
adapting the user interface configuration in real time in response to the current operator behavior of the designated operator and/or changes in the technical context data for the industrial plant operation data.

\* \* \* \* \*